United States Patent
Erdtmann et al.

(10) Patent No.: US 6,183,548 B1
(45) Date of Patent: Feb. 6, 2001

(54) INK JET INK SET

(75) Inventors: David Erdtmann; Steven Evans, both of Rochester; Helmut Weber, Webster, all of NY (US)

(73) Assignee: Eastman Kodak Company, Rochester, NY (US)

(*) Notice: Under 35 U.S.C. 154(b), the term of this patent shall be extended for 0 days.

(21) Appl. No.: 09/387,585

(22) Filed: Aug. 31, 1999

(51) Int. Cl.⁷ .................................................. C09D 11/02
(52) U.S. Cl. ..................... 106/31.48; 106/31.27; 106/31.5; 106/31.58
(58) Field of Search ............... 106/31.27, 31.48, 106/31.5, 31.58

(56) References Cited

U.S. PATENT DOCUMENTS

| | | | |
|---|---|---|---|
| 4,420,550 | * 12/1983 | Evans et al. | 430/223 |
| 5,364,461 | * 11/1994 | Beach et al. | 106/31.58 |
| 5,851,273 | 12/1998 | Morris et al. | 106/31.27 |
| 5,997,622 | * 12/1999 | Weber et al. | 106/31.48 |
| 6,001,161 | * 12/1999 | Evans et al. | 106/31.48 |

* cited by examiner

Primary Examiner—Helene Klemanski
(74) Attorney, Agent, or Firm—Harold E. Cole

(57) ABSTRACT

A color ink jet ink set for color printing comprising:

(a) a yellow ink comprising a carrier and Direct Yellow 107, Direct Yellow 132 or Direct Yellow 86;

(b) a magenta ink comprising a carrier and a water soluble, transition metal complex of an 8-heterocyclylazo-5-hydroxyquinoline dye; and (c) a cyan ink comprising a carrier and a sulfonated copper phthalocyanine dye.

20 Claims, No Drawings

INK JET INK SET

FIELD OF THE INVENTION

This invention relates to inks for ink jet printing that provide images with good lightfastness and improved color gamut.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant, which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic co-solvents and high boiling organic solvents, such as hydrocarbons, esters, ketones, etc. For aqueous dye-based inks, the dyes needs to be sufficiently soluble in water to prepare a solution that is capable of producing adequate density on the receiving element and stable for extended periods of storage without precipitation. High quality ink jet printing with dye-based inks requires dyes which will provide both bright hue and good light fastness.

To generate full color prints via ink jet printing, ink sets comprising at least cyan, magenta and yellow inks are normally utilized. In addition a black ink is often added to enhance the printing of text and darker colors. The range of colors that can be produced with a given set of inks defines the color gamut of that ink set. For the production of high quality photorealistic images via ink jet printing, ink sets with a large color gamut are preferred. In addition, it is important that the ink sets produce images with good fastness, especially to light.

The choice of the colorants in ink jet systems is critical for both light fastness and color gamut. The color gamut of an ink set is controlled primarily by the spectral absorption characteristics of the component dyes. The primary dyes (e.g. cyan, magenta and yellow) should only absorb light of the required wavelengths (i.e. have relatively narrow absorption bands) and not overlap excessively with the dyes in the complementary inks. While there are many dyes with bright hues that are useful in ink jet printing, many have poor light fastness. Conversely many light stable dyes suitable for ink jet printing have broad absorption bands and give dull colors and limited color gamut.

U.S. Pat. No. 5,851,273 relates to a set of inks comprising Direct Yellow 132, Magenta 377, Direct Blue 199 and optionally Reactive Black 31 offering good light fastness and color. However there is a problem with this ink set in that the color gamut is not as large as one would like.

It is an object of this invention to provide a set of inks capable of producing images via ink jet printing which have both good lightfastness and better color gamut than the ink sets of the prior art.

SUMMARY OF THE INVENTION

This and other objects are achieved in accordance with the present invention comprising a color ink jet ink set for color printing comprising:

(a) a yellow ink comprising a carrier and Direct Yellow 107, Direct Yellow 132 or Direct Yellow 86;

(b) a magenta ink comprising a carrier and a water soluble, transition metal complex of an 8-heterocyclylazo-5-hydroxyquinoline dye; and (c) a cyan ink comprising a carrier and a sulfonated copper phthalocyanine dye.

Another embodiment of the invention relates to an ink jet printing method for printing color images, comprising the steps of:

providing an ink jet printer that is responsive to digital data signals;

loading the printer with ink receptive substrates;

loading the printer with an color ink jet ink set as described above; and printing on the ink receptive substrates in response to the digital data signals.

DETAILED DESCRIPTION OF THE INVENTION

Dyes referred to by dye numbers are numbers assigned by The Color Index. In a preferred embodiment of the invention, Reactive Black 31, Direct Black 19, Direct Black 168 or Solubilized Sulfur Black 1 (Duasyn ® Black SU-SF) can be added to further increase the available color gamut of this ink set.

For the purpose of this invention, color gamut is specified in the CIELAB metric. Color gamut is defined as the sum of the $a^*$-$b^*$ areas of 9 $L^*$ slices ($L^*$=10, 20, 30, 40, 50, 60, 70, 80 and 90) obtained when a given ink set is used. Color gamut may be obtained through measurement and estimation from a large sample of color patches which is very tedious and time-consuming, or calculated from the measured absorption characteristics of the individual dyes using the techniques described in J. Photographic Science, 38, 163 (1990).

The absorption characteristics of a given image dye will vary to some extent with a change in ink laydown or printed density. This is due to factors such as measurement flare, dye-dye interactions, dye-receiver interactions, dye concentration effects, and the presence of colored impurities in the media. However, by using characteristic vector analysis, sometimes referred to as principal component analysis or eigenvector analysis, one can determine a characteristic absorption curve that is representative of the absorption characteristics of the dye over the complete wavelength and density ranges of interest. The characteristic vector for each dye is thus a two-dimensional array of optical density and wavelength. This technique is described by Albert J. Sant in Photographic Science and Engineering, 5(3), May-June 1961 and by J.L.Simonds in the Journal of the Optical Society of America, 53(8), 968-974 (1963). Characteristic vectors thus derived can be used to calculate the color gamuts of ink sets described below as described in the above reference.

The following commercially available cyan, yellow and black dyes were used to formulate the inks employed in this invention:

A. Direct Blue 199, available as Duasyn Turquoise Blue FRL-SF® from Clariant Corp. as an approximately 10% solution in water.

B. ProJet Cyan 1®, available from Zeneca Specialties as an approximately 10% solution in water.

C. Direct Blue 86, available as Intrajet Blue DES® from Crompton and Knowles as an approximately 10% solution in water.

D. Direct Yellow 107, available as Intrajet Yellow DG® from Crompton and Knowles as an approximately 10% solution in water.

E. Direct Yellow 132, available as ProJet Yellow 1G® from Zeneca Specialties as an approximately 10% solution in water.

F. Direct Yellow 86, available as Aizen DY86® from Hodogaya Chemical Co.

G. Reactive Black 31, available as Duasyn Black KRL-SF® from Clariant Corp. as an approximately 10% solution in water.

H. Direct Black 168, available as Duasyn Black HEF-SF® from Clariant Corp. as an approximately 10% solution in water.

I. Solubilized Sulfur Black 1, available as Duasyn Black SU-SF® from Clariant Corp. as an approximately 10% solution in water.

J. Direct Black 19, available as Keyamine Black G Pure Liquid® from Keystone Corp. as an approximately 10% solution in water.

The magenta inks employed in the invention may by formulated with one or more water soluble, transition metal complexes of 8-heterocyclylazo-5-hydroxyquinoline dyes, represented by Structure 1(below). These dyes are described in copending U.S. Ser. No.'s 09/203,254 now U.S. Pat. No. 6,001,161 and 09/203,258, now U.S. Pat. No. 5,997,622 the disclosures of which are hereby incorporated by reference:

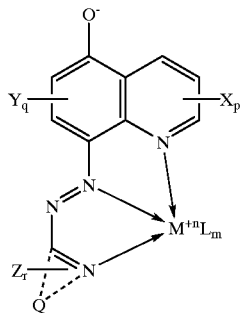

1 wherein:

M represents a polyvalent transition metal ion;

L represents a neutral or anionic ligand;

each X, Y and Z independently represents a substituted or unsubstituted alkyl group of 1 to about 6 carbon atoms, a substituted or unsubstituted aryl group of about 6 to about 10 carbon atoms, a substituted or unsubstituted hetaryl group of about 5 to about 10 carbon atoms, halogen, cyano, a substituted or unsubstituted alkoxy group of 1 to about 6 carbon atoms, hydroxy, a polyoxyalkylene group of 2 to about 20 alkylene oxide residues, carboxy (or a salt thereof), sulfo (or a salt thereof), phospho (or a salt thereof), carbamoyl, a substituted or unsubstituted alkyl-, aralkyl-, aryl-, diaryl- or dialkyl carbamoyl group of 1 to about 20 carbon atoms, sulfamoyl, a substituted or unsubstituted alkyl-, aralkyl-, aryl-, diaryl- or dialkyl-sulfamoyl group of 1 to about 20 carbon atoms, acylamino, sulfonylamino, amino, a substituted or unsubstituted alkyl-, aralkyl-, aryl-, diaryl- or dialkyl-amino group of 1 to about 20 carbon atoms or a quaternary ammonium or phosphonium group;

Q represents the atoms necessary to complete a 5- or 6-membered heterocyclic ring;

n represents 2 or 3;

m represents an integer from 1–3;

each p and r independently represents integers from 0–3;

q represents 0, 1 or 2;

two or more of L may be joined together to form a bi- or tridentate ligand or may represent another polydentate dye molecule;

one or more of X, Y and Z, together with the carbon to which they are attached, may independently represent a ring nitrogen; and any two of X, Y or Z may be joined together to form a 5–7 membered saturated or unsaturated ring;

with the proviso that at least one of X, Y and Z is a water solubilizing group or contains such a group as a substituent.

In a preferred embodiment of the invention, q is 0, Q represents the atoms necessary to complete a pyridine ring, r is 0, M is Ni, n is 2, m is 1, p is 2, X represents 2-methyl and 3-carboxy and L represents a second, identical 8-heterocyclylazo-5-hydroxyquinoline dye residue.

Preferred transition metal ions for M include $Ni^{2+}$, $Cu^{2+}$, $Zn^{2+}$, $Fe^{2+}$, $Fe^{3+}$, $Cr^{3+}$ and $Co^{2+}$.

Examples of neutral ligands for L include water, pyridine, morpholine, ammonia, bipyridine and terpyridine.

Examples of anionic ligands for L include acetate, iminodiacetate, glycine and 8-hydroxyquinoline.

Examples of a substituted or unsubstituted alkyl group for the above substituents include methyl, ethyl, isopropyl, hydroxyethyl, 3-(N, N-dimethylamino)propyl, sulfatoethyl and benzyl. Examples of a substituted or unsubstituted aryl group include phenyl, naphthyl 4-chlorophenyl and 2-carboxyphenyl. Examples of a substituted or unsubstituted hetaryl group include pyridyl, imidazolyl and quinolyl. Examples of halogen include chloro, fluoro, bromo and iodo. Examples of a substituted or unsubstituted alkoxy group include methoxy, isopropoxy, 2-hydroxyethoxy and carboxymethoxy. Useful salts of carboxy, sulfo, phospho and sulfato include sodium, lithium, potassium, triethanolammonium, pyridinium and tetramethylammonium. Examples of a substituted or unsubstituted alkyl-, aralkyl-, aryl-, diaryl- or dialkyl carbamoyl group include N-methylcarbamoyl, N-methyl-N-(3sulfophenyl)-carbamoyl, N-p-(trimethylammonium)phenylcarbamoyl and N,N-bis (4-carboxyphenyl)carbamoyl. Examples of a substituted or unsubstituted alkyl-, aralkyl-, aryl-, diaryl- or dialkyl sulfamoyl group include N-methylsulfamoyl, N-methyl-N-(3 sulfophenyl)-sulfamoyl, N-p-(trimethylammonium)phenylsulfamoyl and N,N-bis (4-carboxyphenyl)sulfamoyl. Examples of an acylamino group include acetamido, carboxyethylacetamido and benzamido. Examples of a ureido group include n-methylureido, ureido and 3,5-bis carboxyphenylureido. Examples of a sulfonylamino group include methanesulfonamido, p-toluenesulfonamido and 2-(trimethlyammonium)ethanesulfonamido. Examples of a substituted or unsubstituted alkyl-, aralkyl-, aryl- diaryl- or dialkyl-amino group include methylamino, N,N-dimethylamino, carboxymethylamino and 2,5-disulfoanilino. Examples of a quaternary ammonium group include trimethylammonium and benzyldimethylammonium. Examples of a phosphonium group include triphenylphosphonium and trimethlyphosphonium.

Examples of heterocyclic ring systems completed by the atoms represented by Q include pyridine, pyrazine, quinoline, thiazole, benzothiazole and pyrazole.

Specific dyes according to Structure 1 useful in this invention include:

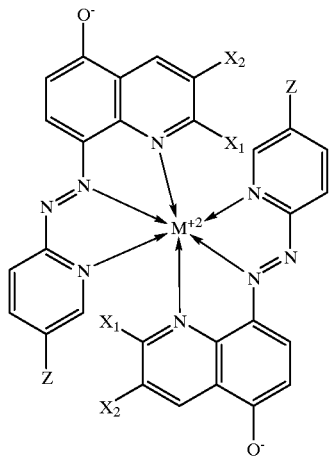

| Dye | M | $X_1$ | $X_2$ | Z | $\lambda$-max[1] |
|---|---|---|---|---|---|
| 1 | Ni | Cl | $CO_2H$ | $SO_2NHCH(CH_3)_2$ | 559 |
| 2 | Cu | Cl | $CO_2H$ | $SO_2NHCH(CH_3)_2$ | 547 |
| 3 | Ni | Cl | $CO_2Na$ | H | 550 |
| 4 | Ni | Cl | $CO_2H$ | H | 551 |
| 5 | Ni | H | $CO_2H$ | H | 546 |
| 6 | Ni | $CH_3$ | $CO_2H$ | H | 552 |
| 7 | Ni | $CO_2H$ | $CO_2H$ | H | 554 |
| 8 | Ni | $OC_2H_5$ | $CO_2H$ | H | 546 |
| 9 | Ni | $SC_3H_6SO_3^-Na^+$ | $CH_3$ | H | 563 |

[1]Measured in 1% aqueous triethanolamine

In general, the inks of this invention comprise the above dyes at entration of from about 0.2 to about 5%, preferably from about 0.4 to about by weight of the ink jet ink composition.

A humectant is usually employed in the ink jet compositions of the nation to help prevent the ink from drying out or crusting in the orifices of the thread. Examples of humectants which can be used include polyhydric holes, such as ethylene glycol, diethylene glycol(DEG), triethylene glycol, propylene glycol, tetraethylene glycol, polyethylene glycol, glycerol, 2-methyl-2,4-pentanediol, 2-ethyl-2-hydroxymethyl-1,3-propanediol(EHMP), 1,5 pentanediol, 1,2-hexanediol, 1,2,6-hexanetriol and thioglycol; lower alkyl mono-or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, poly(ethylene glycol) monobutyl ether (PEGMBE), and diethylene glycol monobutylether (DEGMBE); nitrogen-containing compounds, such as urea, 2-pyrrolidinone, N-methyl-2-pyrrolidinone, and 1,3-dimethyl-2-imidazolidinone; and sulfur-containing compounds such as dimethyl sulfoxide and tetramethylene sulfone.

Preferred humectants for the inks of the invention include DEG, glycerol, DEGMBE, PEGMBE, 1,2-hexanediol, 1,5-pentanediol, urea, 2-pyrrolidinone, EHMP and mixtures thereof.

Water-miscible organic solvents may also be added to the aqueous inks of the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

The amount of aqueous carrier employed is in the range of approximately 70 to 98 weight %, preferably approximately 90 to 98 weight %, based on the total weight of the ink. A mixture of water and a polyhydric alcohol, such as diethylene glycol, is useful as an aqueous carrier. In a preferred embodiment, the inks contain from about 5 to about 60 weight % of water miscible organic solvent. Percentages are based on the total weight of the aqueous carrier.

Surfactants may be added to the ink to adjust the surface tension to an appropriate level. The surfactants may be anionic, cationic, amphoteric or nonionic and used at levels of 0.01 to 1% of the ink composition. Preferred surfactants include Surfynol 465® (available from Air Products Corp.) and Tergitol 15-S-5® (available from Union Carbide).

A biocide may be added to the ink composition employed in the invention to suppress the growth of micro-organisms such as molds, fungi, etc. in aqueous inks. A preferred biocide for the ink composition employed in the present invention is Proxel® GXL (Zeneca Specialties Co.) at a final concentration of 0.0001–0.5 wt. %.

The pH of the aqueous ink compositions employed in the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition employed in the invention may comprise, for example, the following components by weight: colorant (0.05–20%), water (20–95%), a humectant (5–70%), water miscible co-solvents (2–20%), surfactant (0.1–10%), biocide (0.05–5%) and pH control agents (0.1–10%).

Additional additives which may optionally be present in the ink jet ink compositions employed in the invention include thickeners, conductivity enhancing agents, anti-kogation agents, drying agents, and defoamers.

The ink jet inks provided by this invention may be employed in ink jet printing wherein liquid ink drops are applied in a controlled fashion to an ink receptive layer substrate, by ejecting ink droplets from a plurality of nozzles or orifices of the print head of an ink jet printer.

Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

Ink jet inks of the present invention can be used in any of the popular ink jet printing systems, including thermal or piezoelectric drop-on-demand printers and continuous ink jet printers. Of course, the specific ink formulations will vary depending upon the type of ink jet printing system.

Ink-receptive substrates useful in ink jet printing are well known to those skilled in the art. Representative examples of such substrates are disclosed in U.S. Pats. Nos. 5,605,750; 5,723,211; and 5,789,070 and EP 813 978 A1, the disclosures of which are hereby incorporated by reference.

The following examples illustrate the utility of the present invention.

EXAMPLES

Inks containing the following control magenta dyes were prepared and evaluated as comparative examples:

C-1 Reactive Red 23, available as Duasyn Red 3B-SF® from Clariant Corp.

C-2 Direct Red 75, available as Bayscript Red LFB® from Bayer Corporation.

Preparation of inks.

Inks containing the dyes of the invention and control dyes were prepared by dissolving an appropriate amount of the dye in deionized water containing a biocide, Proxel GXL ® at 0.003 wt. % and a mixture of one or more humectants and surfactants. The pH of the inks containing magenta dye 6 of Structure 1 was adjusted to approximately 8 by the addition of triethanolamine. The dye concentrations were based on solution absorption spectra and chosen such that the final ink, when diluted 1:1000, would yield a transmission optical density of approximately 1.0. Details are given in Table 1 below.

TABLE 1

Ink Formulations

| Ink | Dye | Wt. % Dye | Humectant (%) | Surfactant (%) |
|---|---|---|---|---|
| Cy-1 | A | 19.0 | DEG (6), glycerol (6) | Surfynol ® 465 (0.5) |
| Cy-2 | B | 19.8 | DEG (6), glycerol (6) | Surfynol ® 465 (0.5) |
| Cy-3 | A | 19.0 | PEGMBE (12), glycerol (11), DEG (14) | Surfynol ® 465 (0.5) |
| Cy-4 | C | 3.8 | DEG (6), glycerol (6) | Surfynol ® 465 (0.5) |
| M-1 | 6 | 0.58 | DEG (6), glycerol (6) | Surfynol ® 465 (0.5) |
| M-2 | 6 | 0.43 | 1,5-pentanediol (9), 2-pyrrolidinone (8), EHMP (8) | Surfynol ® 465 (0.5) |
| M-3 | 6 | 0.43 | 1,2-hexanediol (9) | Tergitol ® 15-S-5 (1) |
| M-4 | 6 | 0.43 | PEGMBE (12), glycerol (11), DEG(12), urea (7.5) | Surfynol ® 465 (0.5) |
| Y-1 | E | 25.0 | DEG (6), glycerol (6) | Surfynol ® 465 (0.5) |
| Y-2 | D | 19.0 | DEG (6), glycerol (6) | Surfynol ® 465 (0.5) |
| Y-3 | F | 2.2 | DEG (4), EHMP (8), 2-pyrrolidinone(4) | Surfynol ® 465 (0.5) |
| K-1 | G | 34.0 | DEG (6), glycerol (6) | Surfynol ® 465 (0.5) |
| K-2 | H | 35.0 | DEG (6), glycerol (6) | Surfynol ® 465 (0.5) |
| K-3 | I | 34.5 | DEG (6), glycerol (6) | Surfynol ® 465 (0.5) |
| K-4 | J | 18.0 | DEG (6), glycerol (6) | Surfynol ® 465 (0.5) |
| K-5 | G | 34.0 | DEGMBE (11), DEG (1), glycerol (11), 2-pyrrolidinone (4.5) | Surfynol ® 465 (0.5) |
| CM-2 | C-1 | 2.5 | DEG (6), glycerol (6) | Surfynol ® 465 (0.5) |
| CM-3 | C-2 | 9.9 | DEG (6), glycerol (6) | Surfynol ® 465 (0.5) |

In addition, an ink set for the HP 2500 and 3500 printers and determined to contain the cyan, magenta, yellow and black dyes described in U.S. Pat. No. 5,581,273 was obtained from Hewlett-Packard and evaluated as below. These inks are labeled as CCy-1, CM-1, CY-1 and CK-1 in the Tables below.

Printing of test images.

The above inks were then filtered through a 0.45 μ polytetrafluoroethylene filter and placed in a clean Hewlett-Packard ink cartridge No. HP 51629A and fitted into the black ink station of a Hewlett-Packard DeskJet 660 ® printer. A test image consisting of a series of 21 variable density patches, approximately 15 by 13 mm in size, ranging from 5% dot coverage to 100 % dot coverage was printed onto commercially-available Kodak Inkjet Photographic Quality Paper, Catalog No. 899-9161, and allowed to dry for 24 hours at ambient temperature and humidity.

Evaluation of test images

The appropriate Status A red, green or blue reflection densities of the maximum density patch of the above stepped images were measured using an X-Rite® 820 densitometer and these values are listed in Table 2 below. For the black inks, Status A green densities were recorded.

In addition, the spectral absorption curves of 6 of the 21 patches spanning the full density range were measured using a Zeiss Reflection Spectrophotometer having a Xenon pulsed source and a 10 mm nominal aperture. over the wavelength range of 380–750 nanometers using a measurement geometry of 45/0. The characteristic vector (transmission density -vs.- wavelength) for each transferred dye image was calculated as described above, assuming a flare value of 0.001.

The stepped images were then subjected to light fade under 50 Klux high-intensity daylight irradiation and 50% relative humidity conditions for 2 weeks. The appropriate Status A densities of the stepped images were remeasured and the % Status A density remaining for the 75% dot patches were calculated. Again, for the black inks the Status A green density values were used. Values of about 80% or greater for % remaining are preferred. The following results were obtained:

TABLE 2

Ink Density and Light Fade

| Ink | Maximum Density | % Remaining Light Fade |
|---|---|---|
| Cy-1 | 1.53 | 99 |
| Cy-2 | 1.65 | 99 |

TABLE 2-continued

Ink Density and Light Fade

| Ink | Maximum Density | % Remaining Light Fade |
|---|---|---|
| Cy-3 | 2.01 | 95 |
| Cy-4 | 1.32 | 91[a] |
| CCy-1 | 2.09 | 96 |
| M-1 | 1.8 | 96 |
| M-2 | 1.66 | 90 |
| M-3 | 1.69 | 86 |
| M-4 | 1.69 | 79 |
| CM-1 | 2.07 | 66 |
| CM-2 | 1.72 | 99 |
| CM-3 | 1.96 | 92 |
| Y-1 | 1.67 | 97 |
| Y-2 | 1.6 | 96 |
| Y-3 | 1.25 | 99 |
| CY-1 | 1.8 | 98 |
| K-1 | 2.05 | 98 |
| K-2 | 1.7 | 93 |
| K-3 | 2.35 | 100 |
| K-4 | 2.28 | 94 |
| K-5 | 2.36 | 99 |
| CK-1 | 2.3 | 96 |

The data in the above Table show that the cyan, magenta, yellow and black inks employed in the invention give images which have good light fastness (% retained greater than about 80%). The magenta inks employed in the invention also have better light stability than the magenta ink of the prior art, CM-1. Comparative magenta inks CM-2 and CM-3 have good light stability but give inferior color gamut as will be shown below.

Using the characteristic vectors for the individual inks described above, color gamuts for a number of ink sets of the invention and control ink sets (CIS) were alculated as described in J. Photographic Science, 38, 163 (1990). Because differences in density can impact the calculation of color gamut and mask differences due to the spectral absorption characteristics of the dyes, the Status A densities for the cyan, magenta, yellow and black images were assumed to all be equal to 2.0 for the purposes of the calculations. The gamut results are listed in the Table below.

TABLE 3

| Ink Set | Cyan | Yellow | Magenta | Black | Color Gamut |
|---|---|---|---|---|---|
| 1 | Cy-1 | Y-1 | M-1 | K-1 | 64,100 |
| 2 | Cy-1 | Y-1 | M-2 | K-1 | 64,900 |
| 3 | Cy-1 | Y-1 | M-3 | K-1 | 65,900 |
| 4 | Cy-1 | Y-1 | M-4 | K-1 | 64,500 |
| 5 | Cy-2 | Y-1 | M-1 | K-1 | 66,000 |
| 6 | Cy-3 | Y-1 | M-1 | K-1 | 67,000 |
| 7 | Cy-4 | Y-1 | M-1 | K-1 | 67,200 |
| 8 | Cy-1 | Y-2 | M-1 | K-1 | 63,600 |
| 9 | Cy-1 | Y-3 | M-1 | K-1 | 60,600 |
| 10 | Cy-1 | Y-1 | M-1 | K-2 | 63,800 |
| 11 | Cy-1 | Y-1 | M-1 | K-3 | 63,700 |
| 12 | Cy-1 | Y-1 | M-1 | K-4 | 63,800 |
| 13 | Cy-1 | Y-1 | M-1 | K-5 | 64,200 |
| CIS-1 | CCy-1 | CY-1 | CM-1 | CK-1 | 60,300 |
| CIS-2 | Cy-1 | Y-1 | CM-2 | K-1 | 55,400 |
| CIS-3 | Cy-1 | Y-1 | CM-3 | K-1 | 56,500 |

The above data show that the inks employed in the invention give images with larger color gamut than the ink set of the prior art (CIS-1). Similarly the inks of the invention give images with superior color gamut relative to ink sets containing other light fast magenta dyes (e.g. CIS-2 and CIS-3). Thus the inks of the invention yield images with a combination of excellent light fastness and color gamut that is not possible with ink sets of the prior art.

The invention has been described in detail with particular reference to useful embodiments thereof, but it will be understood that variations and modifications can be effected within the spirit and scope of the invention.

What is claimed is:

1. A color ink jet ink set for color printing comprising:
   (a) a yellow ink comprising a carrier and Direct Yellow 107, Direct Yellow 132 or Direct Yellow 86;
   (b) a magenta ink comprising a carrier and a water soluble, transition metal complex of an 8-heterocyclylazo-5-hydroxyquinoline dye; and
   (c) a cyan ink comprising a carrier and a sulfonated copper phthalocyanine dye.

2. The ink jet ink set of claim 1 wherein said water soluble, transition metal complex of an 8-heterocyclylazo-5-hydroxyquinoline dye is represented by the following structure:

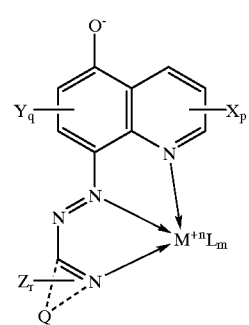

1 wherein:

M represents a polyvalent transition metal ion;

L represents a neutral or anionic ligand;

each X, Y and Z independently represents a substituted or unsubstituted alkyl group of 1 to about 6 carbon atoms, a substituted or unsubstituted aryl group of about 6 to about 10 carbon atoms, a substituted or unsubstituted hetaryl group of about 5 to about 10 carbon atoms, halogen, cyano, a substituted or unsubstituted alkoxy group of 1 to about 6 carbon atoms, hydroxy, a polyoxyalkylene group of 2 to about 20 alkylene oxide residues, carboxy, sulfo, phospho, carbamoyl, a substituted or unsubstituted alkyl-, aralkyl-, aryl-, diaryl- or dialkyl carbamoyl group of 1 to about 20 carbon atoms, sulfamoyl, a substituted or unsubstituted alkyl-, aralkyl-, aryl-, diaryl- or dialkyl-sulfamoyl group of 1 to about 20 carbon atoms, acylamino, sulfonylamino, amino, a substituted or unsubstituted alkyl-, aralkyl-, aryl-, diaryl- or dialkyl-amino group of 1 to about 20 carbon atoms or a quaternary ammonium or phosphonium group;

Q represents the atoms necessary to complete a 5- or 6-membered heterocyclic ring;

n represents 2 or 3;

m represents an integer from 1–3;

each p and r independently represents integers from 0–3;

q represents 0, 1 or 2;

two or more of L may be joined together to form a bi- or tridentate ligand or may represent another polydentate dye molecule;

one or more of X, Y and Z, together with the carbon to which they are attached, may independently represent a ring nitrogen; and any two of X, Y or Z may be joined together to form a 5–7 membered saturated or unsaturated ring;

with the proviso that at least one of X, Y and Z is a water solubilizing group or contains such a group as a substituent.

3. The ink jet ink set of claim 2 wherein q is 0, Q represents the atoms necessary to complete a pyridine ring, r is 0, M is Ni, n is 2, m is 1, p is 2, X represents 2-methyl and 3-carboxy and L represents a second, identical 8-heterocyclylazo-5-hydroxyquinoline dye residue.

4. The ink jet ink set of claim 1 wherein said copper phthalocyanine dye is Direct Blue 199 or Direct Blue 86.

5. The ink jet ink set of claim 1 wherein each ink contains a humectant.

6. The ink jet ink set of claim 1 wherein each ink contains a surfactant.

7. The ink jet ink set of claim 1 further comprising as an additional ink a black ink comprising a carrier and Reactive Black 31, Direct Black 19, Direct Black 168 or Solubilized Sulfur Black 1.

8. The ink jet ink set of claim 1 wherein each said carrier is water.

9. The ink jet ink set of claim 1 wherein each ink contains 0.05 to 20 weight percent of dye.

10. The ink jet ink set of claim 1 wherein each ink contains from about 5 to about 70 weight percent of humectant.

11. An ink jet printing method for printing color images, comprising the steps of:

providing an ink jet printer that is responsive to digital data signals;

loading said printer with ink receptive substrates;

loading said printer with an ink jet ink set for color printing comprising:
(a) a yellow ink comprising a carrier and Direct Yellow 107, Direct Yellow 132 or Direct Yellow 86;
(b) a magenta ink comprising a carrier and a water soluble, transition metal complex of an 8-heterocyclylazo-5-hydroxyquinoline dye; and
(c) a cyan ink comprising a carrier and a sulfonated copper phthalocyanine dye;

and printing on said ink receptive substrates in response to said digital data signals.

12. The method of claim 11 wherein said water soluble, transition metal complex of an 8-heterocyclylazo-5-hydroxyquinoline dye is represented by the following structure:

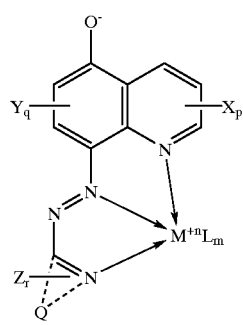

wherein:

M represents a polyvalent transition metal ion;

L represents a neutral or anionic ligand;

each X, Y and Z independently represents a substituted or unsubstituted alkyl group of 1 to about 6 carbon atoms, a substituted or unsubstituted aryl group of about 6 to about 10 carbon atoms, a substituted or unsubstituted hetaryl group of about 5 to about 10 carbon atoms, halogen, cyano, a substituted or unsubstituted alkoxy group of 1 to about 6 carbon atoms, hydroxy, a polyoxyalkylene group of 2 to about 20 alkylene oxide residues, carboxy, sulfo, phospho, carbamoyl, a substituted or unsubstituted alkyl-, aralkyl-, aryl-, diaryl- or dialkyl carbamoyl group of 1 to about 20 carbon atoms, sulfamoyl, a substituted or unsubstituted alkyl-, aralkyl-, aryl-, diaryl- or dialkyl-sulfamoyl group of 1 to about 20 carbon atoms, acylamino, sulfonylamino, amino, a substituted or unsubstituted alkyl-, aralkyl-, aryl-, diaryl- or dialkyl-amino group of 1 to about 20 carbon atoms or a quaternary ammonium or phosphonium group;

Q represents the atoms necessary to complete a 5- or 6-membered heterocyclic ring;

n represents 2 or 3;

m represents an integer from 1–3;

each p and r independently represents integers from 0–3;

q represents 0, 1 or 2;

two or more of L may be joined together to form a bi- or tridentate ligand or may represent another polydentate dye molecule;

one or more of X, Y and Z, together with the carbon to which they are attached, may independently represent a ring nitrogen; and any two of X, Y or Z may be joined together to form a 5–7 membered saturated or unsaturated ring;

with the proviso that at least one of X, Y and Z is a water solubilizing group or contains such a group as a substituent.

13. The method of claim 12 wherein q is 0, Q represents the atoms necessary to complete a pyridine ring, r is 0, M is Ni, n is 2, m is 1, p is 2, X represents 2-methyl and 3-carboxy and L, represents a second, identical 8-heterocyclylazo-5-hydroxyquinoline dye residue.

14. The method of claim 11 wherein said copper phthalocyanine dye is Direct Blue 199 or Direct Blue 86.

15. The method of claim 11 wherein each ink contains a humectant.

16. The method of claim 11 wherein each ink contains a surfactant.

17. The method of claim 11 wherein said ink jet ink set further comprising as an additional ink a black ink comprising a carrier and Reactive Black 31, Direct Black 19, Direct Black 168 or Solubilized Sulfur Black 1.

18. The method of claim 11 wherein each said carrier is water.

19. The method of claim 11 wherein each ink contains 0.05 to 20 weight percent of dye.

20. The method of claim 11 wherein each ink contains from about 5 to about 70 weight percent of humectant.

* * * * *